United States Patent [19]

Copeland

[11] 3,767,431

[45] Oct. 23, 1973

[54] POLISHING COMPOSITION

[76] Inventor: Henry A. Copeland, 2259 Morris Ave., Bronx, N.Y. 10453

[22] Filed: Dec. 23, 1971

[21] Appl. No.: 211,668

[52] U.S. Cl. .................. 106/8, 106/268, 106/311
[51] Int. Cl. ............................................. C09d 1/14
[58] Field of Search .................. 106/8, 9, 311, 268

[56] References Cited
UNITED STATES PATENTS 2,865,859  12/1958  Lubowe ............................ 106/311
1,390,691  9/1921  Ellis .................................. 106/9
2,100,425  11/1937  Bent .................................. 106/311
2,306,114  12/1942  Bent et al. ........................ 106/311

OTHER PUBLICATIONS

Chem. Abst. 51:15,151, 1956.

*Primary Examiner*—Theodore Morris
*Attorney*—Ostrolenk, Faber, Gerb & Soffen

[57] ABSTRACT

A polishing composition is provided containing burnt oil or peanut oil, wood alcohol and varnish remover.

6 Claims, No Drawings

POLISHING COMPOSITION

Innumerable polish compositions have been described in the patent and technical literature. Many of these compositions contain a wax and/or a thinner such as turpentine, naphtha or carbon tetrachloride. I have not found, however, a polishing composition which is entirely satisfactory and will provide a high gloss, mask the defects and clean the surfaces to which they are applied.

Accordingly, it is the object of this invention to provide a new polishing composition which will provide a high gloss to, mask the defects, and clean the surfaces to which it is applied.

The object of this invention is fulfilled by preparing a polishing composition from either burnt oil or peanut oil, wood alcohol and varnish remover.

The use of peanut oil or burnt oil (a motor vehicle or petroleum oil) depends upon the surface to be polished. The peanut oil is preferred for furniture and the burnt oil is preferred for polishing vinyl surfaces. In general, the burnt oil or peanut oil is employed in an amount of about 82 to 86 volume percent based on the total volume of the oil, wood alcohol and varnish remover; in a preferred embodiment, the oil will be about 84 volume percent.

The wood alcohol is generally used in an amount of about 8 to 13 volume percent, preferably about 11 volume percent based on the total volume of the oil, wood alcohol and varnish remover.

Any of the commercially available varnish removers can be used in the composition of this invention. I particularly prefer a varnish remover which is a mixture of benzene, acetone and methyl alcohol. Generally, the varnish remover will be about 3 to 8 volume percent, preferably about 5 volume percent, of the total volume of the oil, wood alcohol and varnish remover.

For polishing vinyl surfaces, and possibly for polishing dark furniture, a colorant or stain can be added to the polishing composition. Any of the commercially available materials which are soluble in the polishing composition can be used. Such material is generally employed in an amount of about 8 to 13 volume percent, preferably about 11 volume percent based on the total volume of the oil, wood alcohol and varnish remover.

A polishing composition for application to vinyl surfaces can be prepared, for example, by mixing two quarts of a black stain with four gallons of burnt oil. Thereafter, two quarts of wood alcohol and one quart of varnish remover (a mixture of benzene, acetone and methyl alcohol) are added.

A furniture polish can be prepared by adding, for example, two quarts of wood alcohol and one quart of the varnish remover (a mixture of benzene, acetone and methyl alcohol) to four gallons of peanut oil.

Both of the foregoing polishes impart a high gloss to the surfaces, mask defects and scratches in the surfaces and clean the surfaces during application.

Various changes and modifications can be made in the polishing composition of this invention without departing from the spirit and the scope thereof. The various embodiments disclosed herein were presented in order to further illustrate the invention but were not intended to limit it.

I claim:

1. A polishing composition consisting of peanut oil; wood alcohol; and varnish remover wherein the varnish remover is a mixture of benzene, acetone and methyl alcohol.

2. The polishing composition of claim 1 wherein the oil is about 82 to 86 volume percent, the wood alcohol is about 8 to 13 volume percent, and the varnish remover is about 3 to 8 volume percent, the volume percentages being based on the total volume of the oil, wood alcohol and varnish remover.

3. The polishing composition of claim 1 wherein the oil is about 84 volume percent, the wood alcohol is about 11 volume percent, and the varnish remover is about 5 volume percent, the percentages being based on the total volume of the oil, alcohol and varnish remover.

4. The polishing composition of claim 3 additionally containing a coloring agent.

5. The polishing composition of claim 4 wherein the coloring agent is used in an amount of about 8 to 13 volume percent based on the total volume of the oil, wood alcohol and varnish remover.

6. The polishing composition of claim 5 wherein the coloring agent is about 11 volume percent.

* * * * *